United States Patent [19]
Barnard et al.

[11] 3,785,297
[45] Jan. 15, 1974

[54] MOTORIZED RAILWAY SCALE TEST CAR

[75] Inventors: Benjamin R. Barnard, Minnetonka; Douglas A. Puariea, St. Paul, both of Minn.

[73] Assignee: The Maxson Corporation, Ramsey, Minn.

[22] Filed: July 26, 1971

[21] Appl. No.: 166,084

[52] U.S. Cl. ............... 105/112, 73/1 B, 73/146, 105/116, 105/217, 105/218 R, 105/238 R, 177/1, 177/163, 254/86 R
[51] Int. Cl. ...... B61c 7/00, B61c 9/00, B61d 15/00
[58] Field of Search ............ 73/1 B, 1 R, 146; 105/112, 116, 177, 217, 218 R, 219, 238 R; 177/1, 50, 145, 146, 163; 254/86 R; 104/1 R; 295/42

[56] References Cited
UNITED STATES PATENTS

| | | | |
|---|---|---|---|
| 1,099,405 | 6/1914 | Stein | 254/86 R X |
| 3,450,062 | 6/1969 | Pradon | 105/177 |
| 399,152 | 3/1889 | McLean | 105/116 |
| 1,799,943 | 4/1931 | Alden | 105/218 R X |
| 1,189,637 | 7/1916 | Summers | 105/219 X |
| 1,526,530 | 2/1925 | Clifford | 254/86 R |
| 1,646,310 | 10/1927 | Osthoff | 105/116 |
| 398,207 | 2/1889 | Weis | 105/112 |
| 490,307 | 1/1893 | Philipsborn et al. | 105/112 |

*Primary Examiner*—Gerald M. Forlenza
*Assistant Examiner*—Howard Beltran
*Attorney*—Robert M. Dunning

[57] ABSTRACT

A railway scale testing car of a known weight which is self propelling and which has jacks designed to lift the entire car and truck on a short section of rail including special retaining brackets to lift the wheels and axles as well.

7 Claims, 10 Drawing Figures

PATENTED JAN 15 1974 3,785,297

INVENTOR
BENJAMIN R. BARNARD
DOUGLAS A. PUARIEA
BY Robert M. Dunning
ATTORNEY

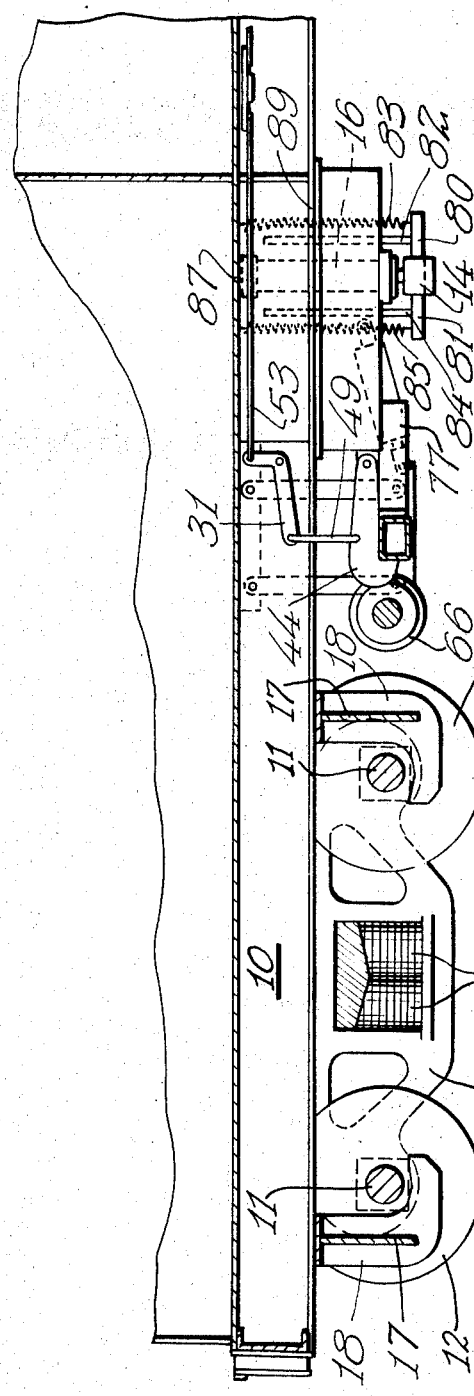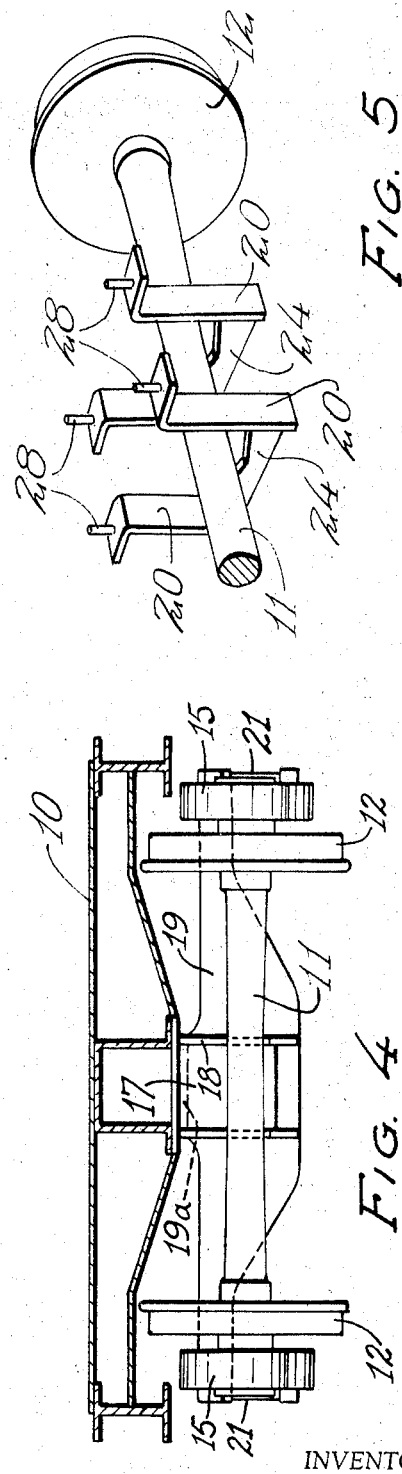

INVENTOR
BENJAMIN R. BARNARD
DOUGLAS A. PUARIEA
BY Robert M. Dunning
ATTORNEY 3,785,297

MOTORIZED RAILWAY SCALE TEST CAR

BACKGROUND OF THE INVENTION

Railroads generally build car weighing scales directly into the rails and these scales are tested and calibrated from time to time by placing test cars of known weight on the scale. Since the scales often encompass only short sections of track the test cars have jacks underneath to lift the entire car with the weight supported through the jacks onto the short section of track. This is an expensive and time consuming operation since the test cars must be shuttled about and positioned by valuable engines and crews which could be better employed elsewhere. To alleviate this problem our invention contemplates apparatus to make the test car self propelling.

BRIEF SUMMARY OF THE INVENTION

Our invention employs a set of small hydraulically driven wheels pivoted under the test car which can be pivoted into rolling frictional contact with the main car wheels so as to propel the test car. Our invention also contemplates special brackets designed to engage and lift the wheels of the test car whenever the test car itself is raised on the jacks. Another improvement disclosed herein involves the use of guide bars and springs attached to the jacks to keep them aligned with the tracks and prevent them from accidentally dropping to the rails. Thus, it may be seen that it is an object of my invention to provide an improved scale testing car which can be propelled by a single man thus eliminating the necessity of using expensive engines and crews to move them around. It is a further object of my invention to provide a scale testing car which is safer to operate by virtue of having wheel lifting brackets which secure the wheels firmly in alignment with the tracks and further with mechanisms designed to insure that the jacks remain in alignment with the tracks. Further objects and advantages will become apparent upon consideration of the following description and drawings.

BRIEF DESCRIPTION OF THE DRAWINGS

FIG. 4 is an end sectional view of a portion of the railway car of FIG. 1 showing the brackets designed to lift the wheels clear of the track.

FIG. 5 is a perspective view of another embodiment of the brackets that can be used for lifting the wheels with the car.

FIG. 6 is a side view of a portion of a car of FIG. 1 showing the relative positions of the lifting brackets, the self propelling mechanism, and showing in particular the guide bars and springs attached to the jacks for keeping them aligned with the tracks.

DESCRIPTION OF THE PREFERRED EMBODIMENT

Figure 1:
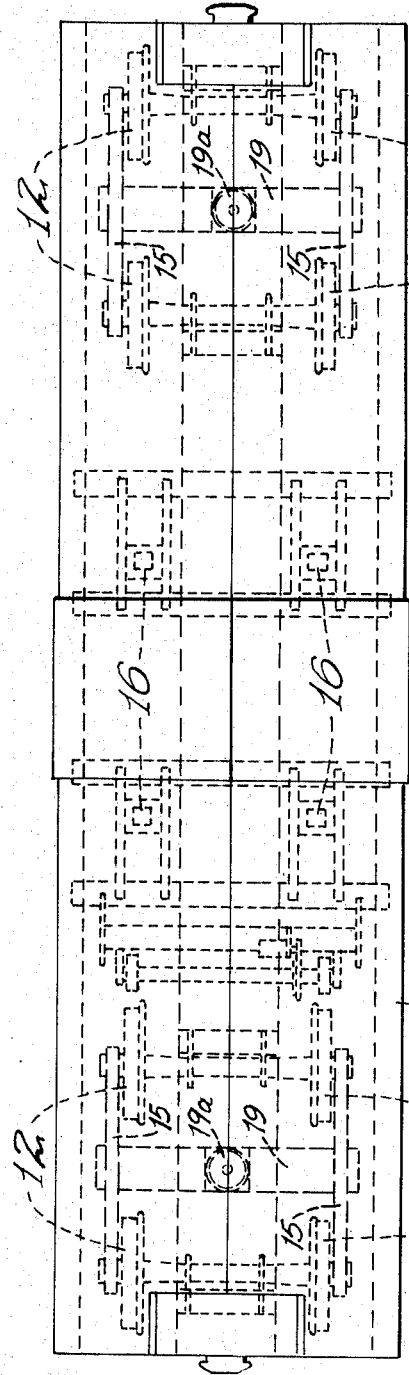
FIG. 1 is a top view of the railway car of the present invention showing generally the location of the lifting jacks, the brackets designed to lift the wheels, and the self propelling mechanism.
Figure 2:
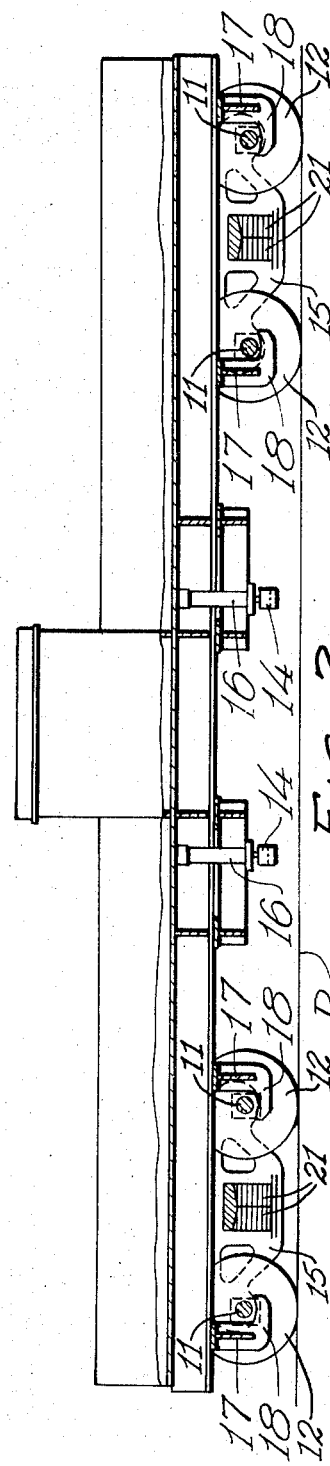
FIG. 2 is a side elevation sectional view showing the railway car on the rail.
Figure 3:
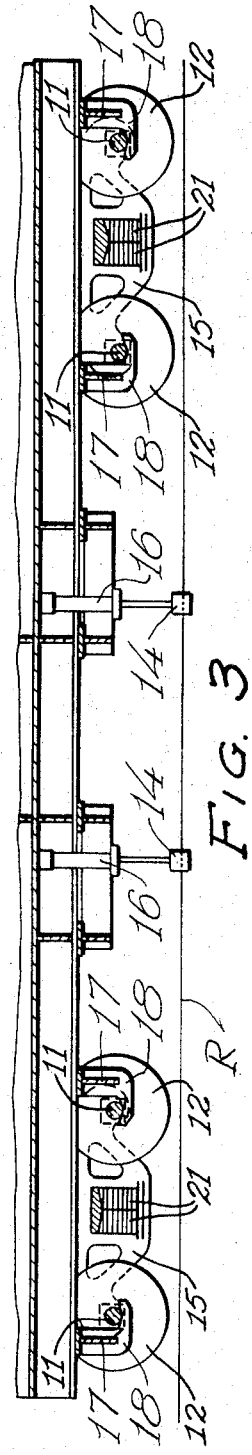
FIG. 3 is a side elevation sectional view showing the railway car and truck lifted by its internal jacks off the rail.
Figure 10:
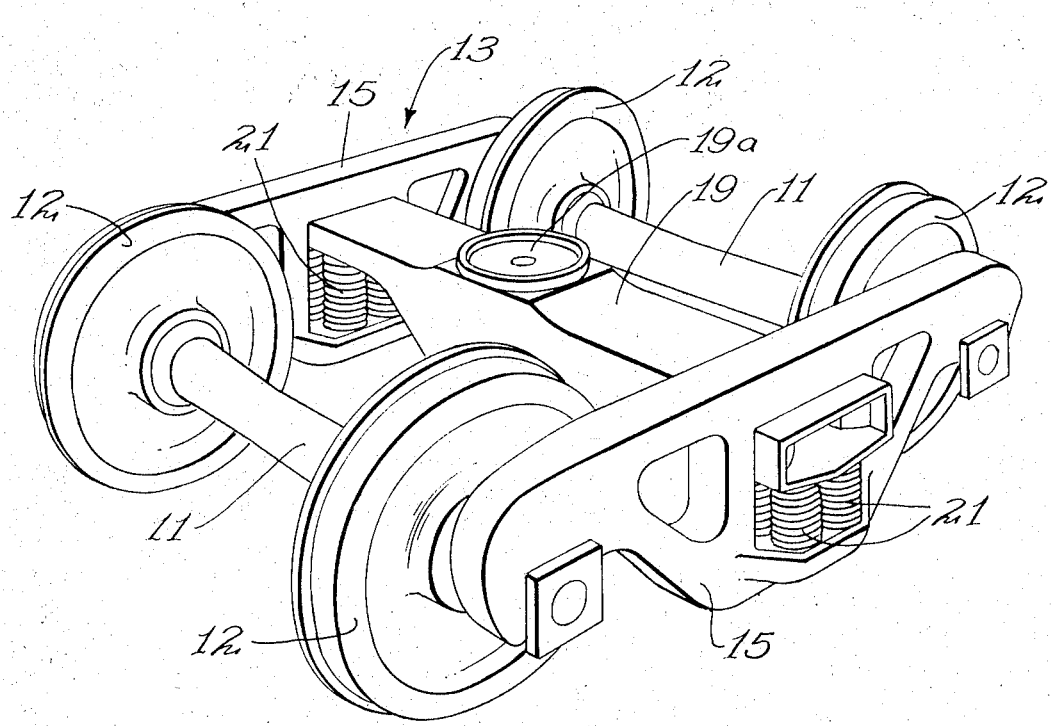
FIG. 10 is a view of a prior art main truck support omitted from the other figures to make the inventive components more visible.

In FIG. 1 a top view of the scale testing car of the present invention is presented. The position of the four lifting jacks 16 may easily be seen in FIG. 1 along with the position of the wheels 12 and the self propelling mechanism which is between the left set of wheels and the center of the car. The self propelling mechanism will be described at length later on. In FIG. 2 a side elevation view of the car of FIG. 1 is presented. Lifting jacks 16 have rail gripping members 14 at their bottom end which are extended downward against the rail and used to lift the car as shown in FIG. 3. In order to insure that all the wheels of the car are lifted clear of the rails but remain in alignment with the car, a series of J-shaped brackets 18 are fastened to the bottom of the car so as to extend underneath the axle 11 supporting wheels 12. These brackets are more clearly shown in FIG. 4 and FIG. 6. Generally the brackets comprise a pair of J-shaped members 18 spaced by a plate 17. The lower portion of the J-shaped members have a notch in them so that axle 11 rests comfortably on the J-shaped bracket. In FIG. 4 it should be noticed that brackets 18 are spaced far enough apart so that wheels 12 can be lifted without any danger of them tilting either to the left or to the right. However, the brackets are limited as to how far apart they can be placed by the fact that the entire wheel and axle arrangement must pivot somewhat when the test car travels around curves. It should be noted that each set of wheels 12 are mounted under the main deck with conventional railway trucks such as truck 13 shown in FIG. 10 only. These trucks are not shown in the other figures for the sake of clarity. These prior art trucks typically utilize a pair of axles 11 which extend through wheels 12 to support side beams 15 from underneath. The deck 10 of the scale car rests on a pivot bearing member 19a in the center of a transverse beam 19. Transverse beam 19 is carried by a plurality of springs 21 which rest in pockets in side beams 15.

An alternate bracket embodiment is shown in FIG. 5 in which U-shaped brackets are used to lift axle 11 and wheel 12. Here the brackets are formed from a pair of L-shaped pieces 20 which are bolted by means of bolts 28 to the bottom of the car and connected together by notched members 24 which are looped underneath axle 11.

Returning to FIG. 6 it may be seen that rail gripping members 14 have small tabs 80 and 81 extending from both sides from which a set of springs 83 and 85 extend upwards to deck member 87. Also connected to tabs 80 and 81 are a pair of guide bars 82 and 84 which travel up through guide holes in deck 89 and operate to insure that rail gripping members 14 stay in the positions shown in FIG. 6, namely, in alignment with the rail. Springs 83 and 85 insure that rail gripping member 14 cannot drop to the ground in the event of a hydraulic pressure failure in jack 16.

Figure 7:
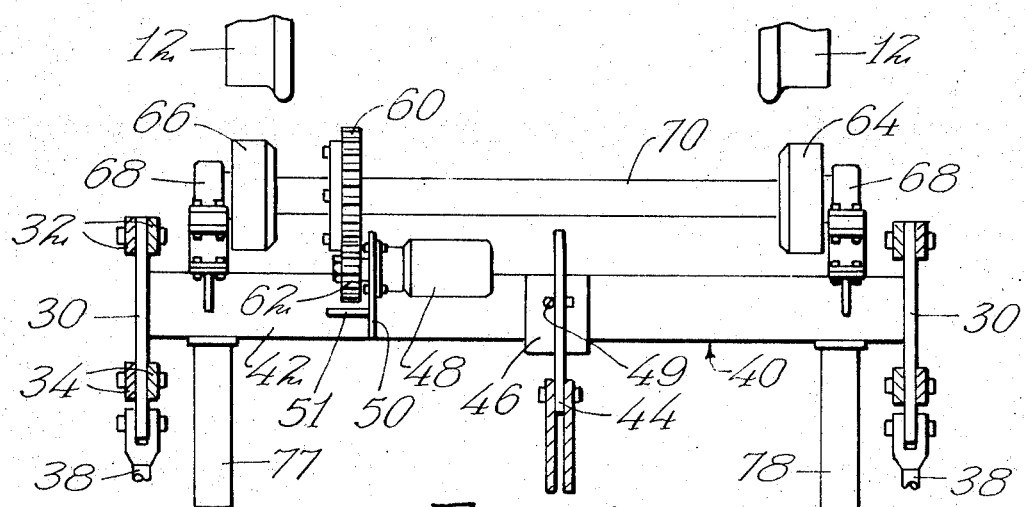
FIG. 7 and FIG. 8 show overhead and side view respectively of the self propelling mechanism.
Figure 8:
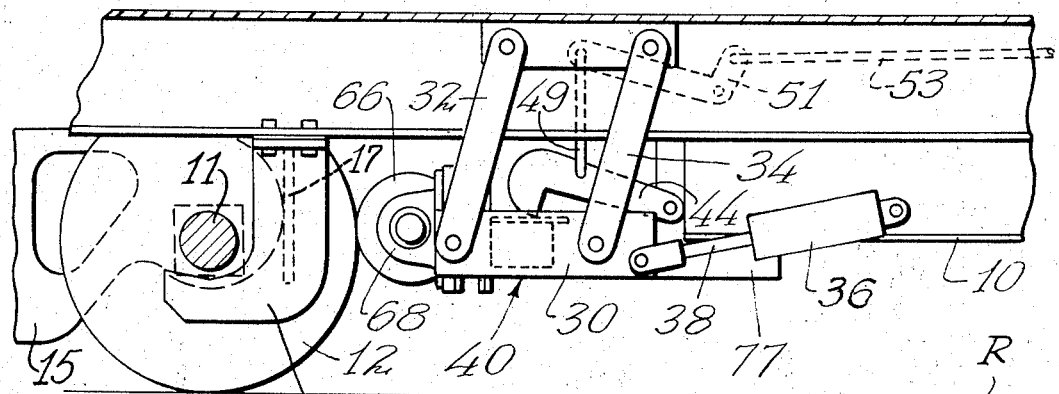

Referring now to FIG. 7 and FIG. 8 the self propelling mechanism will be described. A sub frame 40 formed from a pair of side brackets 30 and a cross member 42 is pivoted underneath the car by means of a pair of parallel pivot brackets 32 and 34. Using two pivot brackets insures that sub frame 40 will remain relatively parallel to the ground and to the bottom of the railway car. Mounted on cross member 42 are a pair of bearings 68 which carry an axle 70 upon which two friction drive wheels 64 and 66 are mounted. These wheels are turned by a gear 60 on axle 70 which is driven in turn by a gear 62 from a hydraulic motor 48 mounted on cross member 42 by means of a bracket 50 and a bracket 51. Cross member 42 normally rests against a pair of stops 77 and 78 which are fastened to the bottom of car 10. Cross member 42 is held in this position by means of a hook 44 which wraps around cross member 42 and is pivoted on car 10. In order to activate the drive mechanism the operator who stands at the side of the car activates linkage rods 53 which move a bell crank 51 and a linkage rod 49 so as to lift hook 44 from cross member 42. At this point a pair of hydraulic cylinders 36 may be activated so as to move brackets 30 and consequently sub frame 40 forward by means of actuating rods 38. This presses drive wheels 64 and 66 into contact with main wheels 12. At this point in time the hydraulic motor 48 may be activated so as to turn gears 62 and 60, drive wheels 64 and 66 and main wheels 12 thus moving the car either ahead or back depending upon the direction of rotation chosen for hydraulic motor 48. It should be noted that hook 44 rests on top of a skid plate 46 on cross member 42. When the car is in position and the sub frame 42 is retracted, hook 44 again falls into place thus holding sub frame 40 solidly against stop members 77 and 78, free and clear of wheels 12.

Figure 9:
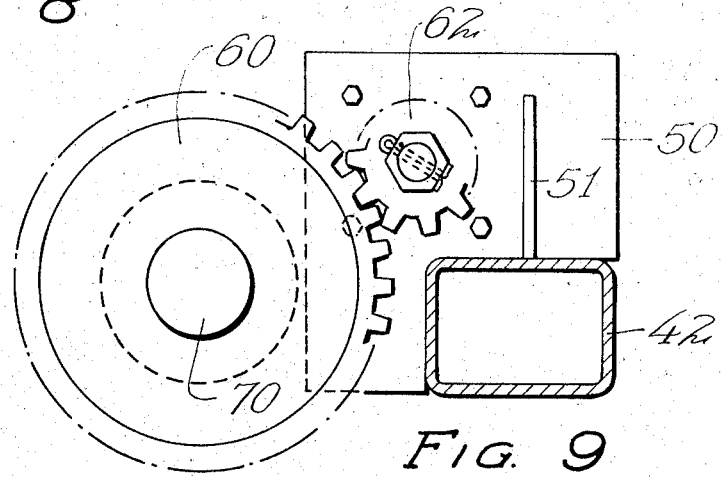
FIG. 9 is a detailed view of the gear drive mechanism used in the self propelling apparatus.

FIG. 9 presents a detailed drawing showing the mounting brackets 50 and 51 for supporting drive motor 48 and gear 62 in engagement with gear 60. The rectangular configuration of cross piece 42 is also evident in FIG. 9. Of course many variations may be made to the present invention without departing from the spirit and scope of the invention.

While the rails R are illustrated in the drawings by single lines, it will be understood that the rails are of conventional type, only the upper surfaces of the rails being indicated.

The lifting brackets shown include only two embodiments but other arrangements will be readily obvious to one of ordinary skill in the art. Likewise, variations in the drive system may be possible including different mounting means for the drive wheels and different type of drive motors. Thus, the following claims are presented to cover the invention in its proper scope and spirit.

I claim:

1. In a railway car for testing scales having a deck with axle carried main wheels mounted thereunder, and lifting means under said deck to engage the rails and lift the car on the rails the improvement comprising means for self propelling said car including motor driven means operable to be moved into frictional engagement with said wheels said motor driven means comprising a pivotally hung pair of drive wheels carried on a sub frame pivoted on generally parallel pivot arms, in which the pair of drive wheels are pressed against the main wheels by a hydraulic cylinder connected between the deck and said sub frame.

2. The apparatus of claim 1 including a plurality of bracket means mounted to the bottom of said deck and positioned to extend under the axles of said axle carried wheels so as to lift said wheels from the rails when the railway car is lifted by said lifting means.

3. The apparatus of claim 2 in which said motor driven means comprises a drive wheel means driven by hydraulic motor means.

4. The apparatus of claim 2 in which some of said bracket means comprises at least two J-shaped bracket members spaced far enough apart to carry said axle carried wheels without tilting.

5. The apparatus of claim 2 in which some of said bracket means comprises at least two U-shaped bracket members encircling the axles and secured to the deck at both ends of the bracket said U-shaped bracket members spaced far enough apart to carry said axle carried wheels without tilting.

6. The apparatus of claim 1 including latch means to hold the pivotable pair of drive wheels clear of the main wheels.

7. The apparatus of claim 6 in which said lifting means comprises hydraulic jacks and including guide bars to keep the hydrualic jacks in alignment with the rails and further including springs connected between said jacks and said deck to support said jacks against accidentally contacting the rails.

* * * * *